US006347931B1

(12) United States Patent
Underwood

(10) Patent No.: US 6,347,931 B1
(45) Date of Patent: Feb. 19, 2002

(54) BLOCK RAMMING MACHINE

(75) Inventor: James C. Underwood, Franklin, WV (US)

(73) Assignee: The Mountain Institute, Franklin, WV (US)

(*) Notice: Subject to any disclaimer, the term of this patent is extended or adjusted under 35 U.S.C. 154(b) by 0 days.

(21) Appl. No.: 09/498,764

(22) Filed: Feb. 3, 2000

(51) Int. Cl.[7] .......................... B29C 43/04; B29C 43/36

(52) U.S. Cl. ......................... 425/62; 425/256; 425/361; 425/350

(58) Field of Search ............................ 425/62, 193, 89, 425/361, 422, 350, 416, 256, 166, 167, 261; 249/102, 155

(56) References Cited

U.S. PATENT DOCUMENTS

| | | | | | |
|---|---|---|---|---|---|
| 2,537,920 A | * | 1/1951 | Smith | ......................... | 425/200 |
| 3,002,247 A | * | 10/1961 | Dettling et al. | ............. | 425/256 |
| 4,080,891 A | * | 3/1978 | Manko | ....................... | 100/215 |
| 4,153,404 A | * | 5/1979 | Ottman | ....................... | 425/256 |
| 4,559,004 A | * | 12/1985 | Augier | ....................... | 425/256 |
| 4,579,706 A | | 4/1986 | Elkins | ......................... | 264/124 |
| 4,640,671 A | | 2/1987 | Wright | ....................... | 425/149 |
| 5,182,120 A | * | 1/1993 | Kusters et al. | .............. | 425/256 |
| 5,629,033 A | | 5/1997 | Lienau | ....................... | 425/353 |
| 5,851,567 A | * | 12/1998 | Proni | ......................... | 425/412 |
| 5,919,497 A | | 7/1999 | Kofahl | ....................... | 425/416 |
| 6,224,359 B1 | * | 5/2001 | Domazet | ..................... | 425/62 |

OTHER PUBLICATIONS

"Motorized Compressed Earth Blocks Making Machine" (visited and printed Jan. 31, 2000) <http://www.bmtpc.org/machines/motor.htm>.

"Terra–Block brings onsite block manufacturing and remote construction to a New Lower Cost of 1.5 cents per block!" (visited and printed Jan. 31, 2000) <http://www.terra–block-.com>.

"Terra–250 Machine Specifications" (visited and printed Jan. 31, 2000) <http://www.terra–block.com/specs.html>.

"Terra 250 Features" (visited and printed Jan. 31, 2000) <http://www.terra–block.com/eblock.htm>.

"Duplex Sidewinder 500" (visited and printed Jan. 31, 2000) <http://www.terra–block.com/d500.htm>.

"The Gallery" (visited and printed Jan. 31, 2000) <http://www.terra–block.com/gallery.htm>.

"AECT Impact 2001 Compressed Soil Block Machine" (visited and printed Jan. 31, 2000) <http://www.connect-.com/~fwehman/impact2001.html>.

* cited by examiner

*Primary Examiner*—Nam Nguyen
*Assistant Examiner*—Thu Khanh Nguyen
(74) *Attorney, Agent, or Firm*—Fish & Neave; Jeffrey H. Ingerman; Manu J. Tejwani

(57) ABSTRACT

A block ramming machine is provided that includes: (a) a ramming chamber structure having a longitudinal axis, an input end, an output end, and a ramming chamber located between the input and output ends, (b) a headgate assembly located near the output end of the ramming chamber, wherein the assembly comprises a headgate that can have at least an open position and a closed position, (c) a fill chamber structure positioned along the longitudinal axis and having a first end, a second end, and a fill chamber located between the first and second ends, the input end and the second end being coupled so that the material can be transferred from the fill chamber to the ramming chamber, (d) a ramming plate for pushing the material from the fill chamber to the ramming chamber, and (e) an actuator for moving the ramming plate along the longitudinal axis from a position in the fill chamber to a position in the ramming chamber, thereby transferring the material from the fill chamber to the ramming chamber to form a block.

47 Claims, 11 Drawing Sheets

BLOCK RAMMING MACHINE

BACKGROUND OF THE INVENTION

This invention relates to compressed earth block ramming machines, and more particularly to compressed earth block ramming machines that can be manually operated and hydraulically or pneumatically powered.

It is estimated that about two billion people around the world rely on earthen construction for their shelters. Many of these shelters have been constructed from traditional sun dried adobe, rammed earth, and compressed soil blocks. Some of these structures have provided continuous shelter over the last 200 years with minimal maintenance.

Kofahl U.S. Pat. No. 5,919,497 ("the '497 patent") describes an apparatus for forming building blocks that includes an upright compression chamber with an upper end that serves both as an inlet and an outlet. In operation, a soil/cement mixture is loaded into the upper end of the compression chamber, a sliding gate is slid shut, and a ram compresses the mixture against the gate. The gate is opened while the ram is still under pressure, which allows the block to be ejected through the common inlet/outlet. Because the ram shown in the Kofahl patent has an upright orientation, an earth-feeding hopper can not easily be attached and production is slow because the input of the mixture and the output of the blocks is at shoulder level, which makes handling heavy blocks difficult. Furthermore, the headgate of the machine does not compensate for wear and becomes loose in operation.

Another example of a compressed soil block machine is the Impact 2001, which is manufactured by Advanced Earthen Construction Technologies, Inc., of San Antonio, Tex. The Impact 2001 is a hydraulic machine that rams blocks along a vertical axis and then pushes them out on a horizontal axis. In this case, an earth-feed hopper can be moved over the retracted vertical ramming chamber while simultaneously pushing the previously rammed block out, filling the ramming chamber with a fresh charge, and sealing the chamber for the next cycle. Although the Impact 2001 may be an ergonomic improvement over the machine shown by the '497 patent, it is unnecessarily complex (and thus difficult to repair) and expensive, especially in remote country use. Moreover, the vertical dimension of the blocks formed using the Impact 2001 varies too much for use in the interlock dry-stack system; these blocks are meant for lay-up in mortar.

The Green Machine is another known ramming machine (sold by the GreenMachine Technology Company, of Middleburg, Va.) and shares many of the mechanical design features of the Impact 2001. This machine, however, is more mechanically complex, more automated, employs a stop-feature in the vertical ramming action which is claimed to result in a consistent vertical dimension of the blocks produced therewith. Like the Impact 2001, the Green machine is expensive, complicated to repair, expensive to ship, and uses a number of mechanical parts that are not readily available.

Another block ramming machine is the CinvaRam (which was manufactured by Metalibec Ltda., of Bogota, Columbia and sold by Schrader Bellows, of Akron, Ohio). The CinvaRam was developed in the 1950's as a simple, vertical axis ramming machine that uses a hand lever to provide a mechanical advantage for providing increased ramming pressures. The CinvaRam has no hopper; earth is filled into an open top of the ramming chamber when the ramming plate is retracted downward. During operation, the cover is then rotated into place and the level arm is brought across the top and the ramming plate is raised against the top. In addition to being slow, the CinvaRam machine produces blocks with a relatively low density (i.e., poor hardness after cure), which may not satisfy building codes.

Elkins U.S. Pat. No. 4,579,706 ("the '706 patent") describes an apparatus for making blocks from earth, soil, or like material. The '706 patent has a horizontally disposed channel that is provided with (a) a fill chamber, (b) a compression chamber downstream of the fill chamber, and (c) means that, during a first cycle and while inhibiting further material from being supplied to the fill chamber, moves already supplied material from the fill chamber to the compression chamber to form a block and that, during a second cycle, enables further material to be supplied to the fill chamber. A disadvantage of the apparatus shown in the '706 patent is that the endwall of the ramming chamber moves in a direction that is perpendicular to the channel, making it difficult, for example, to form certain types of tongue and groove styled block ends. Moreover, the apparatus shown in the '706 patent necessarily uses different actuators to form blocks and to move blocks after they are formed.

It would therefore be desirable to be able to provide a compressed earth block ramming machine that can operate along any axis, including a substantially horizontal axis.

It would also be desirable to be able to provide a block ramming machine with a headgate that compensates for wear and does not become loose in operation.

It would also be desirable to be able to provide a compressed earth block ramming machine that can produce plain, or tongue and groove earth, blocks that have a relatively high density, and a substantially consistent thickness and width, and variable, yet controllable, length.

It would further be desirable to be able to provide a compressed earth block ramming machine that provides flexible work flow and worksite production.

It would still further be desirable to be able to provide a block ramming machine that is physically small, and that is well-suited to making compressed earth blocks.

It would also be desirable to be able to provide a compressed earth block ramming machine that can be adapted to any local power source, can be easily dismantled for air, jeep, animal, or even human transport, and can be easily maintained in remote field situations.

It would be still more desirable to be able to provide a block ramming machine capable of forming blocks with internal channels or chases for carrying wire and/or piping.

SUMMARY OF THE INVENTION

It is therefore an object of this invention to provide a compressed earth block ramming machine that can operate along any axis, including a substantially horizontal axis.

It is another object of this invention to provide a block ramming machine with a headgate that compensates for wear and does not become loose in operation.

It is also an object of this invention to provide a compressed earth block ramming machine that can produce plain, or tongue and groove, earth blocks of substantially consistent thickness and width, yet of variable and controllable length.

It is a further object of this invention to provide a compressed earth block ramming machine that provides flexibility of work flow and worksite production.

It is yet a further object of this invention to provide a block ramming machine that is physically small, and is particularly well-suited to making compressed earth blocks.

It is yet another object of this invention to provide a compressed earth block ramming machine that can be adapted to any local power source, can be easily dismantled for air, jeep, animal, or even human transport, and can be easily maintained in remote field situations.

It would be yet a further object of this invention to provide a block ramming machine capable of forming blocks with internal channels or chases for carrying wire and/or piping.

In accordance with this invention, a block ramming machine is provided that includes: (a) a ramming chamber structure having a longitudinal axis, an input end, an output end, and a ramming chamber located between the input and output ends, (b) a headgate assembly located near the output end of the ramming chamber, wherein the assembly comprises a headgate that can have at least an open position and a closed position, (c) a fill chamber structure positioned along the longitudinal axis and having a first end, a second end, and a fill chamber located between the first and second ends, the input end and the second end being coupled so that the material can be transferred from the fill chamber to the ramming chamber, (d) a ramming plate for pushing the material from the fill chamber to the ramming chamber, and (e) an actuator for moving the ramming plate along the longitudinal axis from a position in the fill chamber to a position in the ramming chamber, thereby transferring the material from the fill chamber to the ramming chamber to form a block.

Methods for using the machine are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
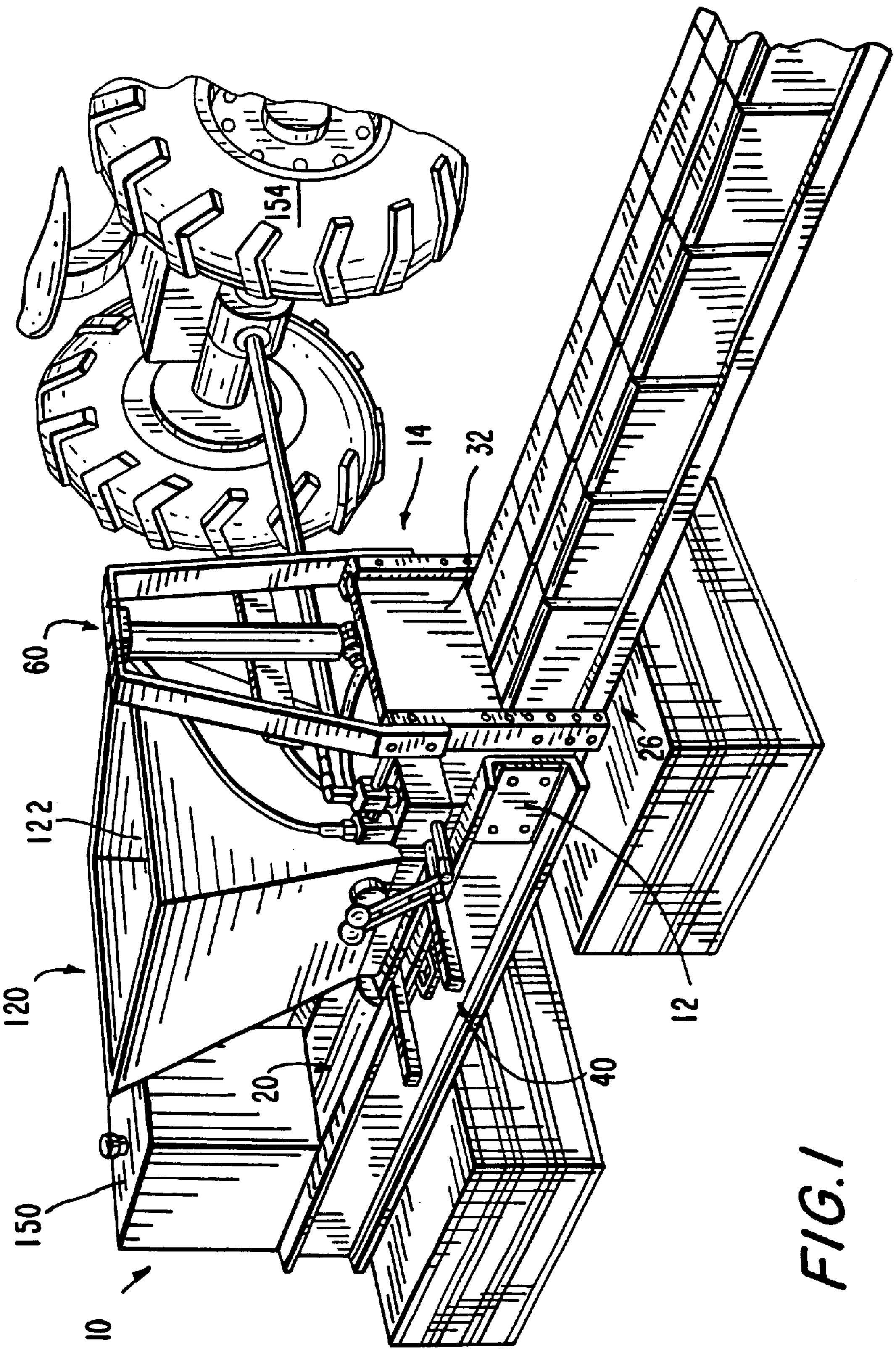
FIG. 1 is a perspective view of an illustrative embodiment of a block ramming machine constructed according to this invention.
Figure 2:
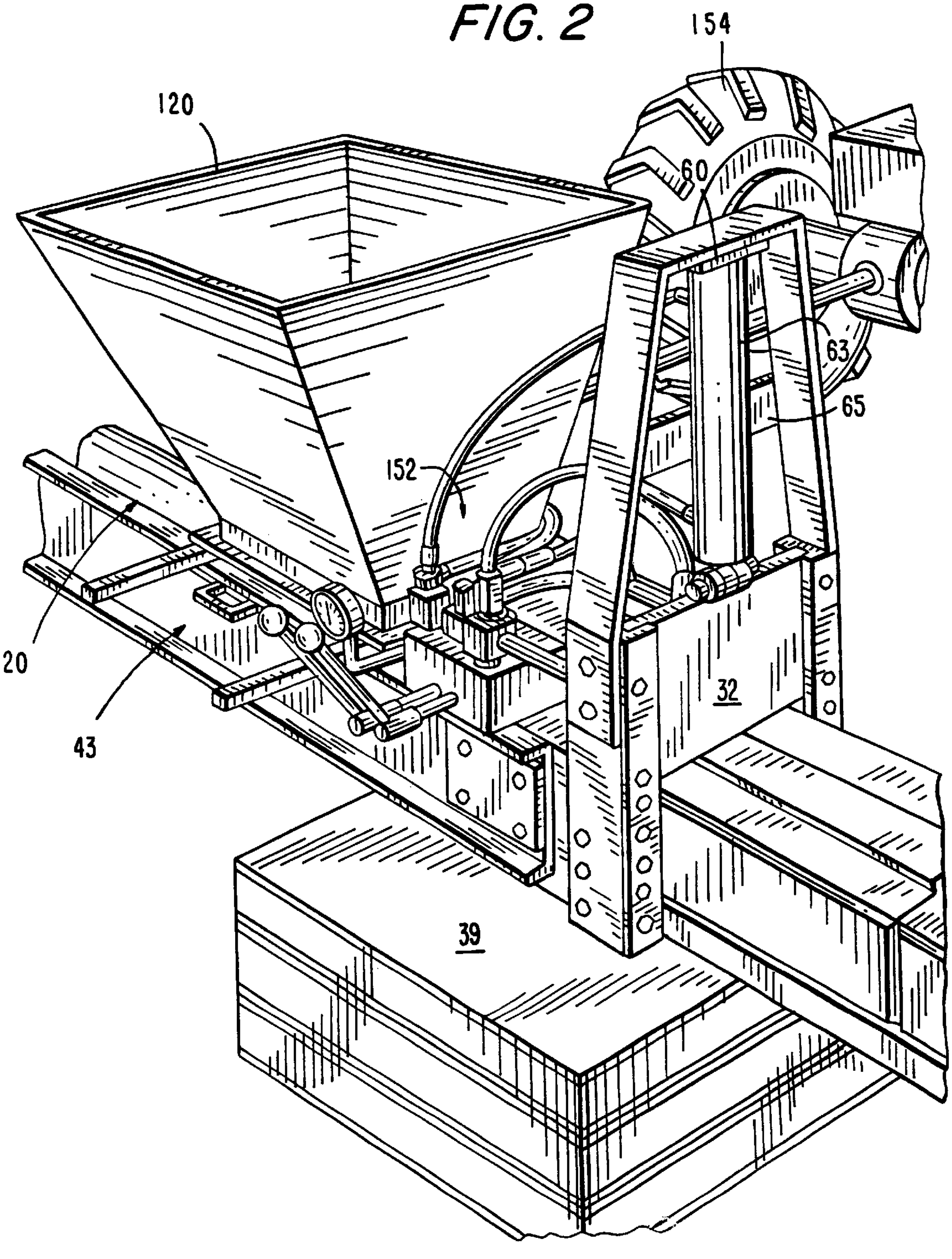
FIG. 2 is another perspective view of the same illustrative embodiment shown in FIG. 1, showing, inter alia, a hydraulic fluid control assembly and a shaft connected thereto.
Figure 3:
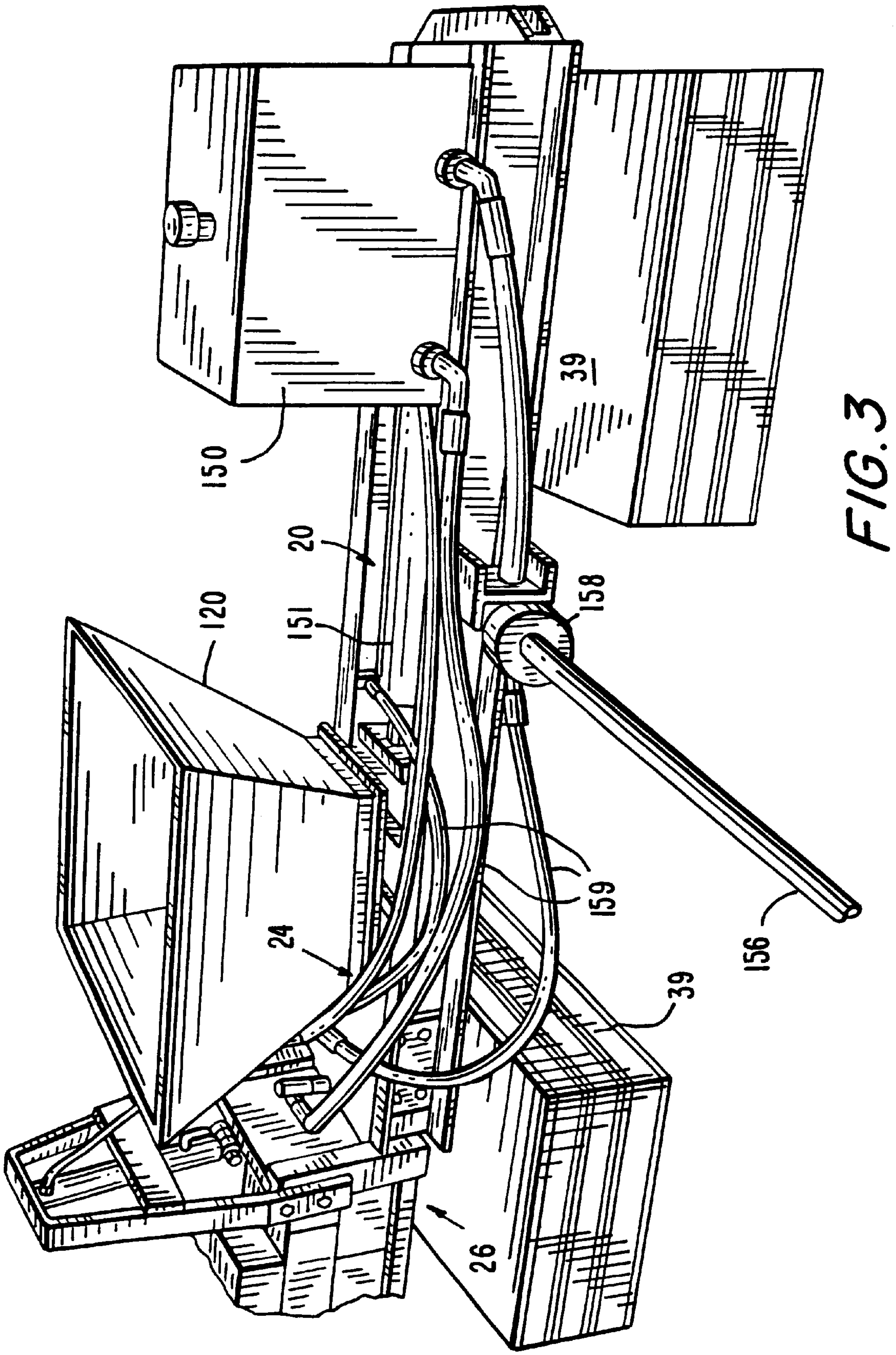
FIG. 3 is yet another perspective view of the same illustrative embodiment shown in FIG. 1, showing in particular a hydraulic pump and a shaft connected thereto.
Figure 4:
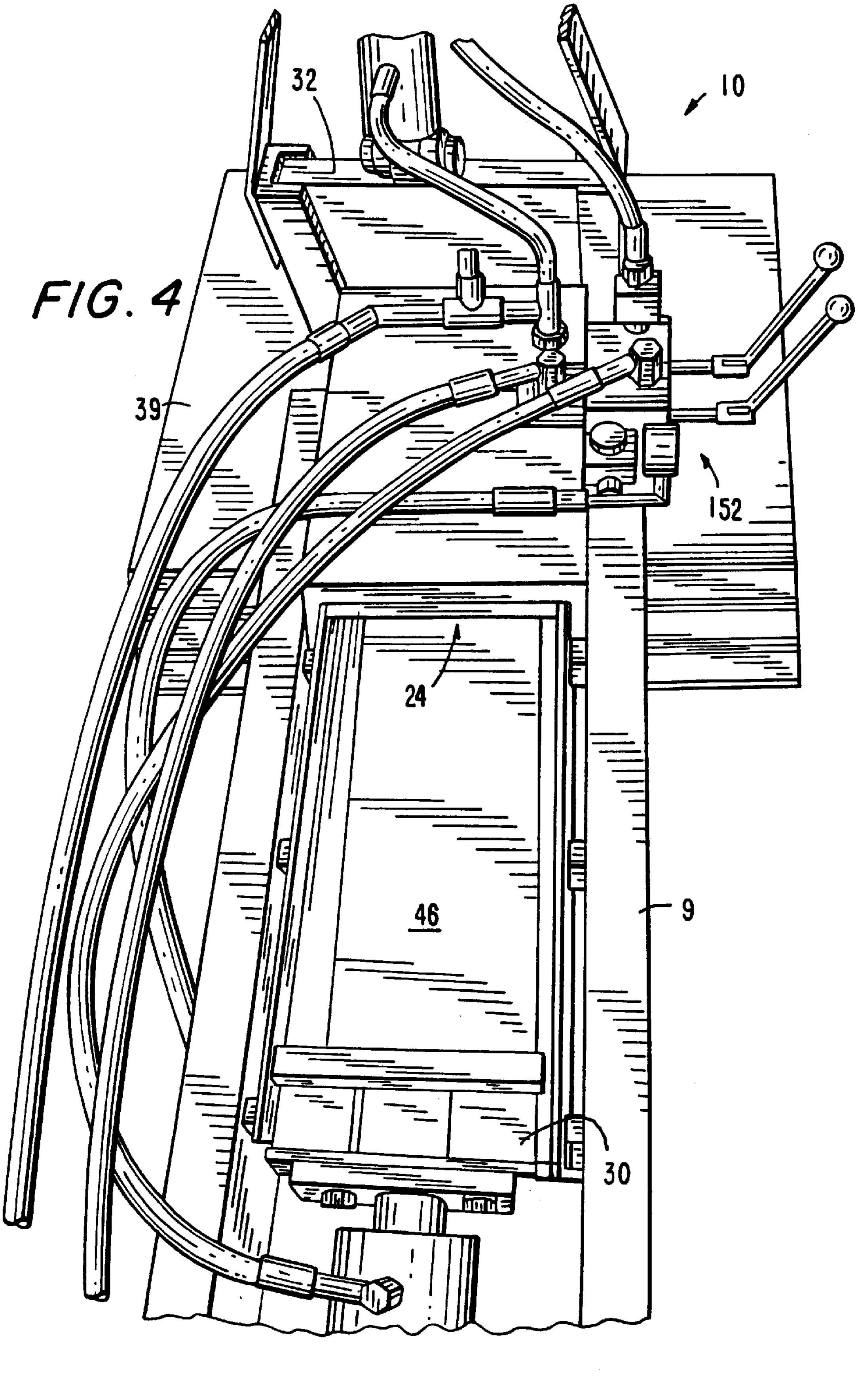
FIG. 4 is yet a further perspective view of the same illustrative embodiment shown in FIG. 1, with the hopper and sliding gate removed, to reveal the inside of the fill chamber.

A block ramming machine according to this invention includes a fill chamber, which may be hopperfed, followed by a ramming (i.e., compression) chamber that is blocked by a headgate, and which can be substantially vertical and hydraulically or pneumatically operated.

During operation, the block making machine can operate along any axis, including a substantially horizontal axis. A main hydraulic piston (part of an actuating device) pushes block-making material (e.g., earth), which can be provided by the hopper, into the main ramming chamber. During this time, the main vertical hydraulic operated head gate is closed (e.g., lowered). The bottom of the hopper can be opened and closed with a sliding gate, such as a hand operated or mechanically following, sliding gate.

When the main horizontal ramming piston has come up to system pressure, which can be varied according to soil type and condition, the main headgate can be opened (e.g., raised) and the main piston, which can be horizontally oriented, can push the rammed earth block out on to a platform. Blocks can be pushed out against each other, meaning that multiple blocks can accumulate on the platform. Such accumulation provides flexibility to work flow and production at a worksite. The main headgate can be machined and the frame bolted so that as the main gate lowers it wedges in against the main ramming chamber. This configuration provides a tight fit to the chamber. A shim system is also provided so that as wear occurs, the tightly fitting configuration is maintained.

The maximum block height and width are determined by the size of the ramming chamber structure, but the actual size can be varied by using replaceable liners of any appropriate size that are attached to the inside surface of the ramming chamber structure, ramming plate, and headgate. Liners also have the beneficial effect of protecting the ramming chamber structure, ramming plate, and headgate from wear, and its attendant ramifications, that normally plagues such machines during extended periods of use.

Block length can be controlled in a number of ways. In one embodiment, length is controlled by a rod that is attached to and therefore follows the ramming plate. The rod is then used to limit the horizontal displacement of the hydraulic piston. Alternatively, the operator can stop the movement of the piston when a desired block length is reached (e.g., by visual markings or automatic sensing device). In another embodiment, the block length can be automatically controlled with a cut-off switch in the hydraulic system that acts in response to the position of the rod or the applied hydraulic pressure.

In any case, the volume of earth provided by the hopper is generally proportional to the block length desired (i.e., less earth for shorter blocks). The volume can be controlled using a blockage system in the hopper. Alternatively, a measured amount can be added when the hopper is empty.

Advantageously, the machine can be adapted to any local power source, can be easily dismantled for air, jeep, animal, or even human transport, and can be easily maintained in remote field situations. It can easily be mounted on an axle and trailered. It can be manufactured in any reasonable developing country welding/machine shop.

The blocks produced can be of the tongue and groove variety on any and all block surfaces, including the end planes. Moreover, the tongue and groove features on the end planes can be oriented in any direction, including the vertical and horizontal directions. The tongue and groove features allow for easy alignment in dry-stacking for building walls.

Illustrative embodiments of block ramming machines that can be constructed according to the present invention are shown in FIGS. 1–14.

Figure 5:
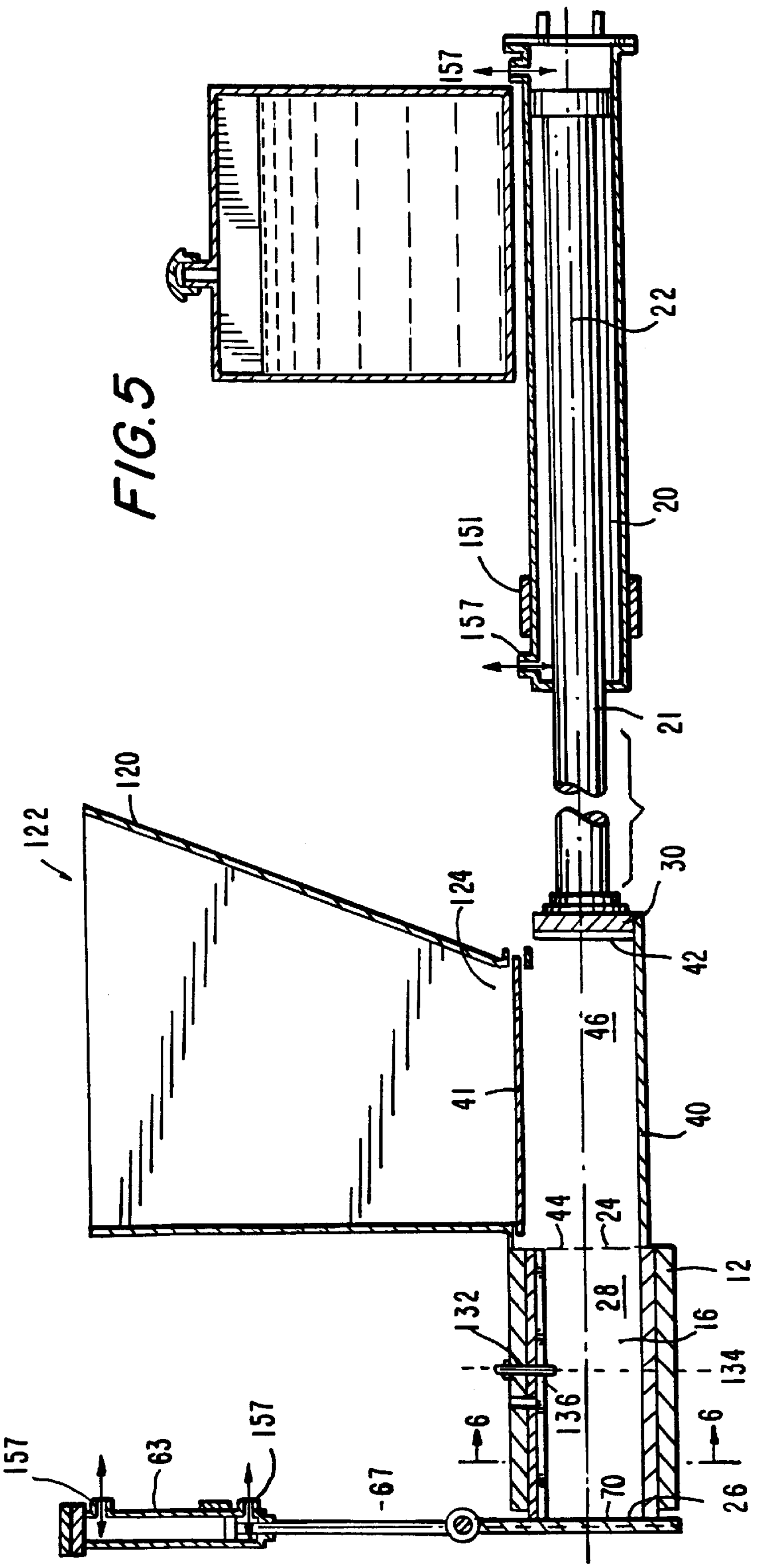
FIG. 5 is a side cross-sectional view of the same embodiment shown in FIG. 1 taken along the machine's longitudinal axis.

As can be seen in FIGS. 1–5, for example, block ramming machine 10 includes ramming chamber structure 12, headgate assembly 14, fill chamber structure 16, ramming plate 30, and actuator 20. As shown best in FIG. 5, ramming chamber structure 12 has longitudinal axis 22, input end 24, output end 26, and internal ramming chamber 28, which is located between input and output ends 24 and 26, respectively. Ramming chamber structure 12 primarily serves as a structural box in which the block-making material can be rammed between ramming plate 30, headgate 32, and any liners that may be used. As also shown in FIG. 5, and explained more fully below, ramming plate 30 moves longitudinally in and out of ramming chamber 16 through input end 24. Headgate 32 moves in a direction that is substantially perpendicular (preferably substantially vertical) to longitudinal axis 22 at output end 26. Base 39 can be any stable support structure, including wooden pallets, as shown in FIGS. 1–4.

Headgate assembly 14 is located at output end 26 of ramming chamber 12. At the very least, a headgate assembly according to the present invention includes headgate 32, which can have at least an open position and a closed position. When headgate 32 is in a closed position, headgate 32 provides a physical end to ramming chamber structure 12 against which a block can be formed. When headgate 32 is in an open position, output end 26 of ramming chamber structure 12 is open and allows a block that has been formed within ramming chamber 16 to be removed. The block can be removed from ramming chamber 16, for example, by pushing the block with ramming plate 30.

Figure 7:
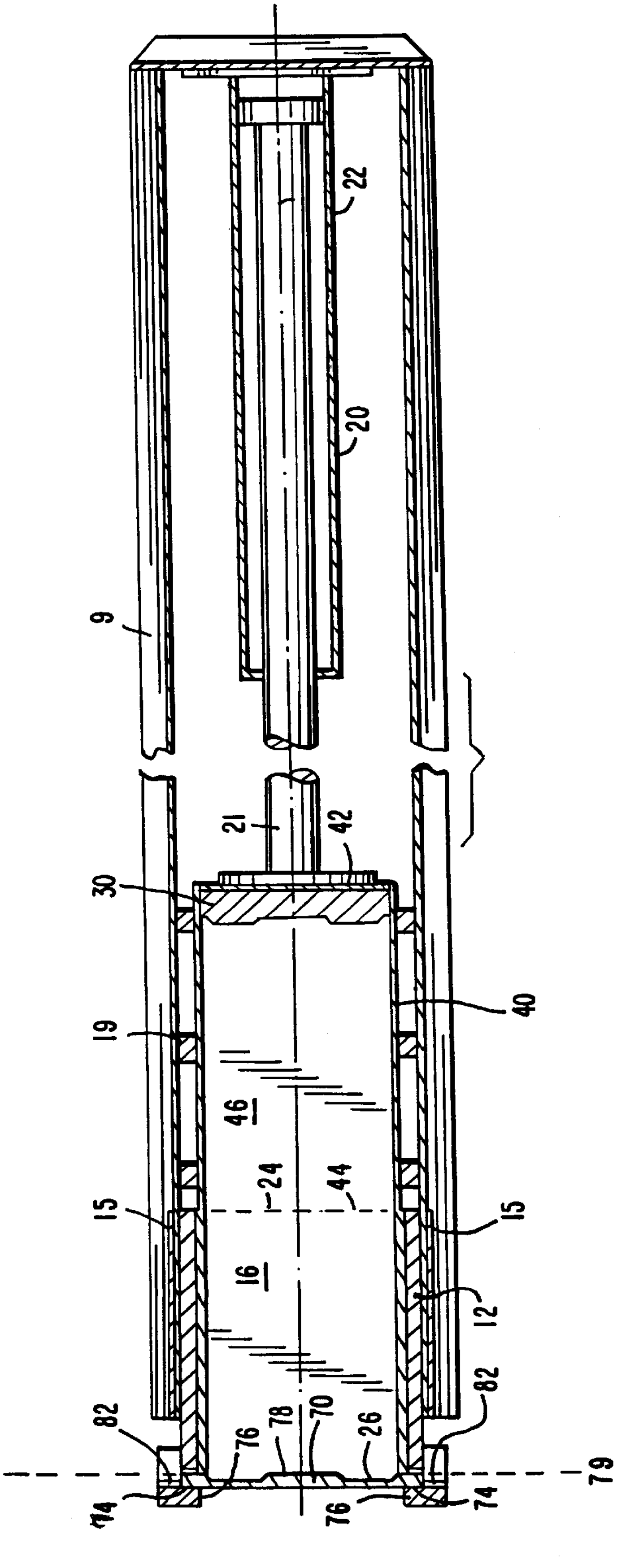
FIG. 7 is a cross-sectional view of the same embodiment shown in FIG. 1, taken along a central longitudinal axis from line 7—7 of FIG. 5.
Figure 8:
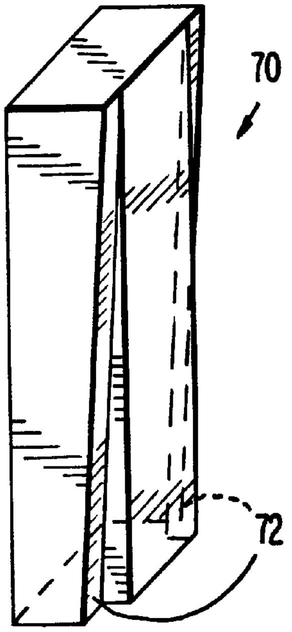
FIG. 8 is a perspective view of an illustrative headgate shown in the same embodiment shown in FIG. 1.

As shown in FIGS. 5 and 7, for example, fill chamber structure 40 is positioned along longitudinal axis 22 and has first end 42, second end 44, and fill chamber 46 located between first end 42 and second end 44. Input end 24 of ramming chamber structure 12 and second end 44 of fill chamber structure 40 are coupled so that block-making material can be transferred from fill chamber 46 to ramming chamber 16. It will be appreciated that block-making material can be inserted into fill chamber 46 when sliding gate 41 is in an open position (see, e.g., sliding gate 41*a* of FIG. 13). FIG. 5 shows sliding gate 41 in a closed position.

As briefly discussed above, ramming plate 30 is for pushing material from fill chamber 46 to ramming chamber 16 and then for ramming the material in ramming chamber 16 to form a block after the material is pushed therein. Actuator 20, through piston 21, supplies pressure to and is the force behind ramming plate 30, which moves along longitudinal axis 22 from a position in (or at an end of) fill chamber 46 to a position inside ramming chamber 16. In one embodiment, actuator 20 can apply a force to ramming plate 30 such that the pressure in ramming chamber 16 is up to between about 1,500 psi and about 2,500 psi during block formation, and preferably about 2,300 psi.

Hydraulic oil tank 150, in combination with pressure control assembly 152, can be used to supply pressure to actuators 20 (which is held in place by brace 151) and 63 (which is held in place by brace 65). The external mechanical power can be supplied to pump 158 via shaft 156 and the pressurized hydraulic fluid can be supplied using conventional hydraulic cables 159. Hydraulic cable connectors 157 are used to attach cables 159 as shown in the FIGS. Pump 158 does not rely on any particular power source and can be adapted to just about any external power source, such as tractor power take-off shaft 154 or an electric motor or combustion engine shaft. Machine 10 can even be powered using a car or truck axle.

Although unnecessary, ramming chamber 16 and fill chamber 46 can be aligned in a substantially horizontal relationship, which facilitates simple loading of the block-making material into fill chamber 46 (e.g., via a hopper) and unloading of blocks from output end 26 of ramming chamber 16. Moreover, platform 50, which is located at output end 26 and extends away from machine 10, provides a convenient place for receiving and temporarily storing blocks after they are formed. Platform 50 can be any structure capable of supporting one or more blocks, such as a pair of 2 inch×4 inch wooden beams. Depending on the length of platform 50, a relatively large number of blocks can be supported in a queue, which provides additional time to remove the blocks after their production, and can allow for a more efficient use of manpower.

Figure 6:
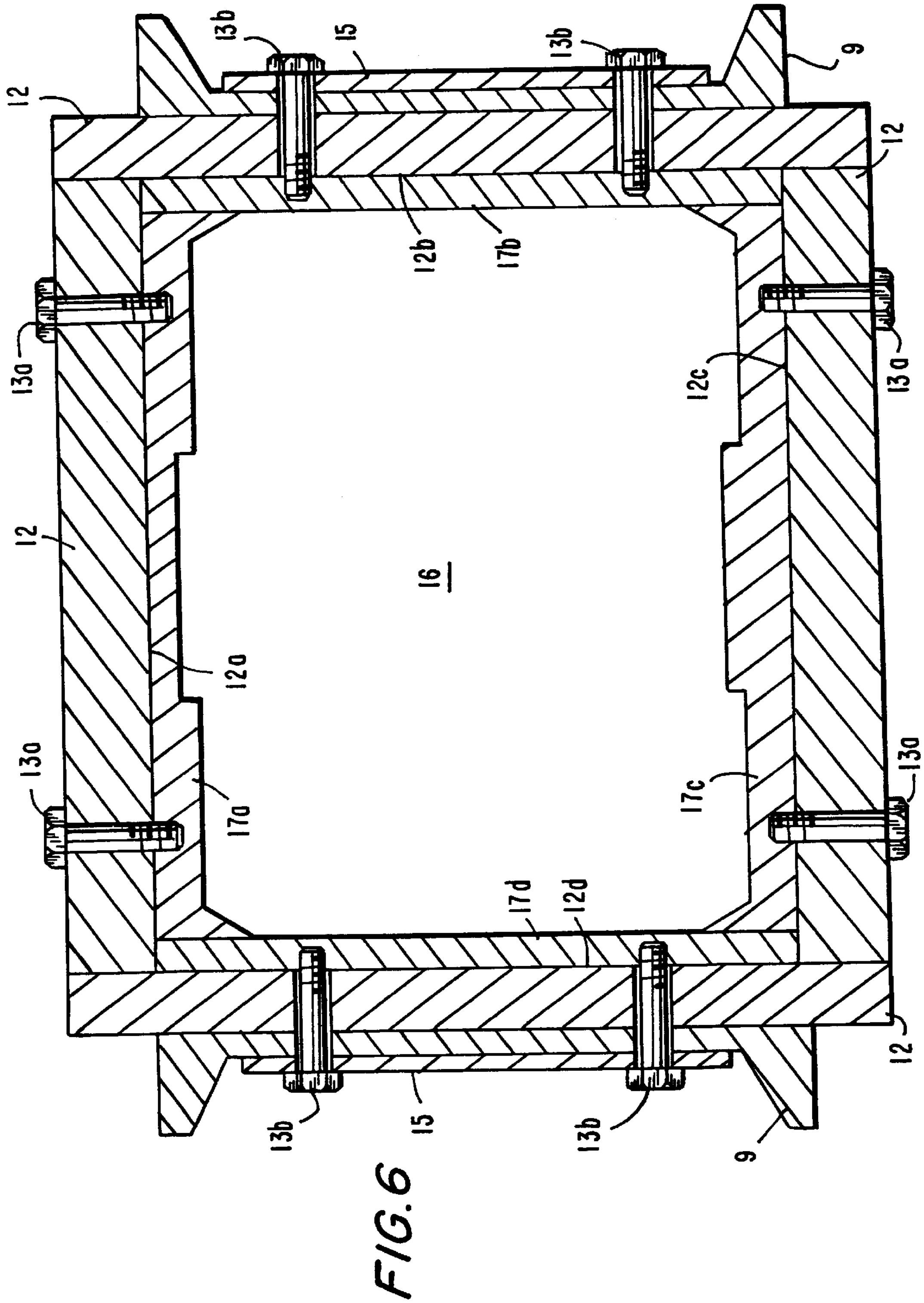
FIG. 6 is a cross-sectional view of the ramming chamber of the same embodiment shown in FIG. 1, taken from line 6—6 of FIG. 5.

As shown in FIG. 6, ramming chamber structure 16 typically has an elongated box-like shape with two open ends that are closed by ramming plate 30 and headgate 32. Thus, ramming chamber structure 12 has four inner surfaces 12*a*–12*d* against which the block can be formed. Preferably, however, these inner surfaces, as well as ramming plate 30 and headgate 32 are provided with replaceable liners, which can be attached to inner surfaces 12*a*–12*d*, for example, by bolts 13*a* and 13*b*. Structural box liners 17*a* and 17*c* preferably extend to match headgate profile, such as the one shown in FIGS. 11 and 12.

In addition to securing liners 17*b* and 17*d* to chamber structure 12, side bolts 13*b* can also secure ramming chamber structure 12 to longitudinal channel irons 9 (with optional washer plates 15). It will be further appreciated that longitudinal channel irons 9 provide the overall structural integrity of machine 10 and also support fill chamber structure 40 via one or more spacers 19.

Liners are useful because they can be replaced easily without a major overhaul of the machine. They also provide a simple means for changing the size and shape of the blocks being formed. For example, a single block ramming machine could include a number of liner sets that are easily interchanged to suit a number of different dimensional criteria.

In one embodiment, as shown in FIG. 6, two replaceable liner 17*a* and 17*c* have a inward facing surface that is not flat. Thus, if inner surfaces 12*a* and 12*c* of ramming chamber structure 12 are flat, corresponding liners 17*a* and 17*c* can have thicknesses that vary as desired. Variable thickness liners, such as liners 17*a* and 17*c*, can be laminate structures, in which two or more liner components work together to form the liner's chamber surface. In an alternative embodiment, the liner can be an integral structure, which can, for example, be either molded or milled to have the desired chamber surface profile. As shown best in FIG. 6, one or more liner chamber surfaces can form a blocks with surface features (e.g., tongues and grooves) that can interlock with other blocks to form a tightly interlocking wall.

Headgate assembly 14 preferably includes headgate frame 60, in which headgate 32 can be slidably moved between open (e.g., raised) and closed (e.g., lowered) positions by another actuator 63 (including piston 67), which can be held in place by brace 65. Thus, in one embodiment, headgate frame 60 is oriented such that headgate 32 can slide in a plane that is substantially vertical or that has an angle between 0 and 10 degrees therefrom. In order to ensure a square block, the headgate's chamber surface (i.e., the inner surface of the headgate or its liner) should be perpendicular to longitudinal axis 22.

As shown best in FIGS. 8–12, a headgate can have at least one wedge shaped portion to reduce the effects of headgate (e.g., liner) wear over extended periods of use. Preferably, both sides of the headgate have wedge shaped portions. For example, headgate 70 includes two wedge shaped portions 72 which can slide in tapered tracks 74 formed in headgate frame 60. In one embodiment, retaining plates 76 can be used to form the tracks. By using headgate 70 (with wedge shaped portions 72) and headgate assembly 14 (with tapered tracks 74), headgate 70 (or its liner) chamber surface 78 maintains substantially the same longitudinal position 79, even as headgate 70 (or its liner) wears down. By maintaining the same longitudinal position of surface 78, the length of the blocks formed in ramming chamber 16 will be maintained as well. Also, one or more shims 82 can be provided between retaining plate 76 and headgate frame 60 to allow for readjustment due to wear of plate 76 and/or headgate 70 or variability in the dimensions of any other headgate assembly component.

Figure 9:
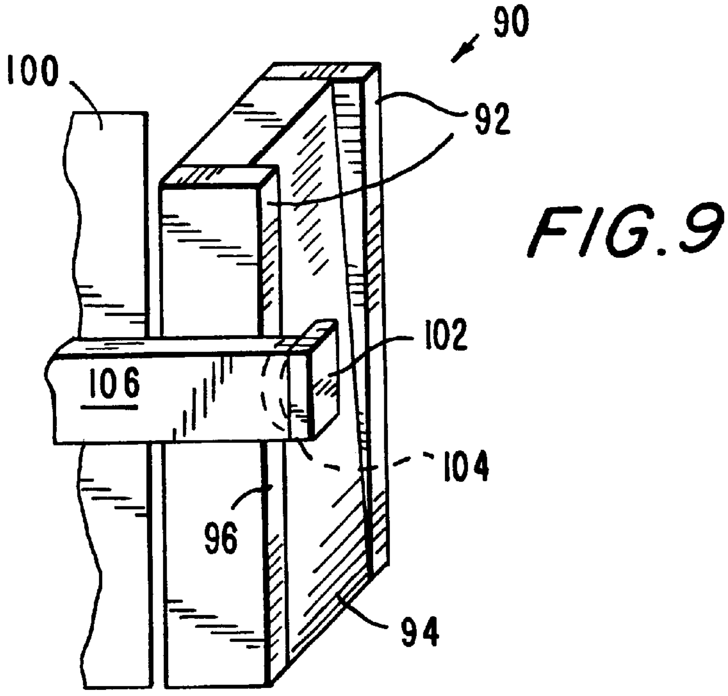
FIG. 9 is a perspective view of another illustrative headgate, held in place between a camming plate and a headgate frame.

FIG. 9 shows an alternative embodiment of a headgate, which is held in place with side bars mounted to a headgate frame. Headgate 90 has wedge shaped portions 92 that are fixed to headgate body 94. As shown, headgate 90 can be guided and slidably mounted between headgate frame 100 and camming plate 102. Camming plate 102 preferably includes curved surface 104 (e.g., convex shaped) that makes contact with surface 96 of wedge shaped portion 92. As shown in FIG. 9, camming plate 102 can be held in place with side bar 106, or the like, that is mounted to headgate frame 100 using any conventional means. Also, one or more shims (not shown) can be provided between camming plate 102 and side bar 106 to allow for readjustment due to (1) wear of camming plate 102 and/or wedge shaped portion 92 of headgate 90 or (2) variability in the dimensions of any other headgate assembly component.

Figure 10:
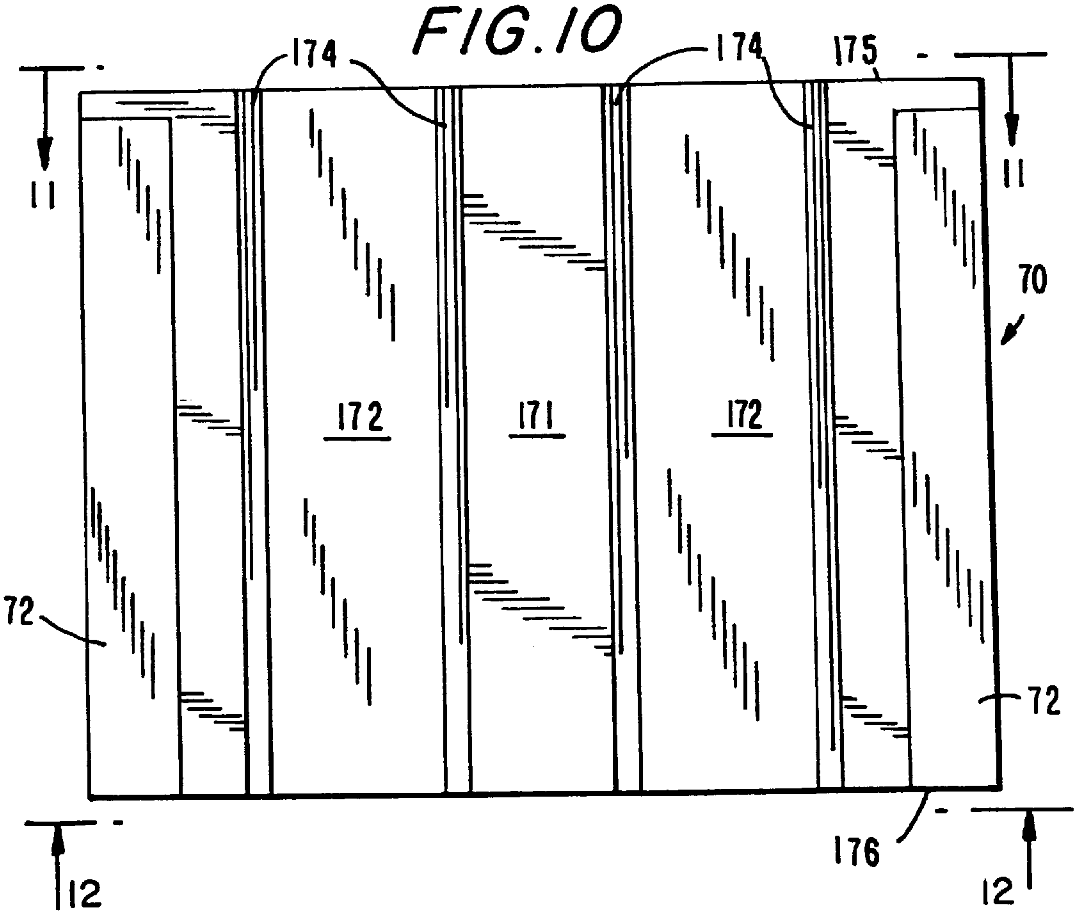
FIG. 10 is a side elevational view of the same headgate shown in FIG. 8.
Figure 11:
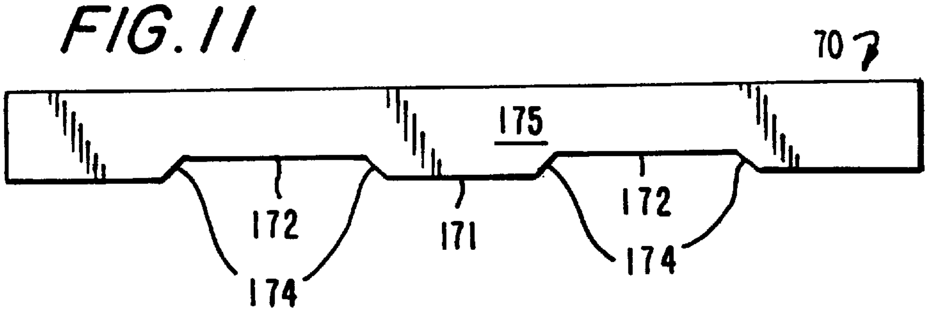
FIG. 11 is a plan view of the same headgate shown in FIGS. 8 and 10, taken from line 11—11 of FIG. 10.
Figure 12:
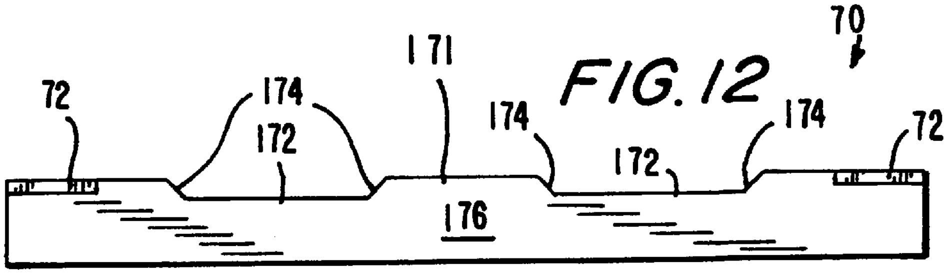
FIG. 12 is a plan view of the same headgate shown in FIGS. 8 and 10, taken from line 12—12 of FIG. 10.

FIG. 10 is a side elevational view of headgate 70. Surfaces 171 and 172 represent raised and lowered flat portions on the inner surface of headgate 70. Angled, or beveled, portions 174 connect flat portions 171 and 172. FIGS. 11 and 12 show upper surface 175 and lower surface 176.

Figure 13:
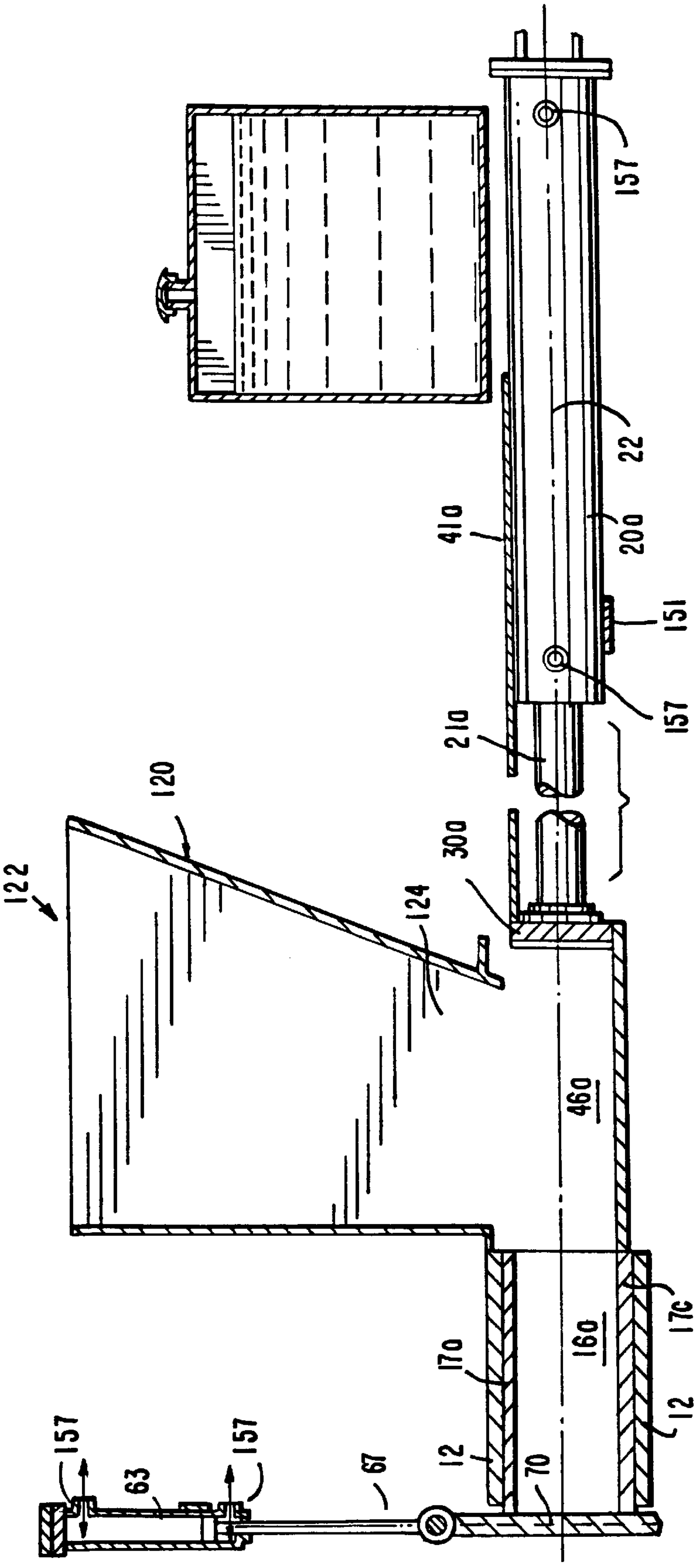
FIG. 13 is a side cross-sectional view of another illustrative embodiment of a block ramming machine that can be constructed according to this invention taken along the machine's longitudinal axis.

As shown in FIG. 5, fill chamber structure 40 can also include sliding gate 41, which can slide (e.g., horizontally) into an open position that permits loading of block-making material into fill chamber 46. Sliding gate 41 can be hand operated using handle 43. Alternatively, as shown in FIG. 13, sliding gate 41*a* can be mechanically coupled to ramming plate 30 such that sliding gate 41*a* moves when ramming plate 30*a* moves. In this way, sliding gate 41*a* will be in a closed position when ramming plate 30*a* is in ramming chamber 16*a* and sliding gate 41*a* is in an open position when ramming plate 30*a* is in or near fill chamber 46*a*.

Preferably, ramming machine 10 also includes hopper 120, which has hopper input 122 and hopper output 124. As shown in FIG. 5, for example, hopper output 124 is coupled to fill chamber 46 (through an opening therein) for adding material to fill chamber 46. Sliding gate 41 can be located between hopper 120 and fill chamber 46 for preventing block-making material from flowing from hopper 120 into fill chamber 46 (behind ramming plate 30) when ramming plate 30 is pushing block-making material into the ramming chamber 16.

Machine 10 can further include a volume control system for controlling the volume of material (e.g., earth) provided to fill chamber 46 via hopper 120. In the simplest case, the volume control system is a container (not shown) of known volume that can be used to control the amount of material placed in hopper 120, or directly into fill chamber 46. In another embodiment, the volume control system can be mounted inside hopper 120 with a variable volume selected by a machine's operator. The volume can be varied, for example, by providing another sliding gate (not shown) above gate 41 that defines a known volume of material between the gates.

Machine 10 can also include a block length control system for controlling the length of blocks formed by machine 10. In one embodiment, such a system can include mechanical stop 132 that prevents ramming plate 30 from pushing material past known position 134 in ramming chamber 16. It will be appreciated that mechanical stop 132 can have a plurality of longitudinal positions 136 or completely removed if desired. When in place, mechanical stop 132 prevents ramming plate 30 from pushing material past a known position 134 in ramming chamber 16. Preferably, apertures 136 (and thus mechanical stop 132) are positioned symetrically along longitudinal axis 22, as shown in FIG. 5, to prevent mechanical stop 132 from applying an unbalanced counterforce to ramming plate 30 during contact. It will be appreciated that although apertures 136 may extend through ramming chamber structure 12 into ramming chamber 28 to make changing the position of mechanical stop simple, apertures 136 may not extend entirely through structure 12. If apertures 136 do extend entirely through structure 12, then a plug should be inserted in any aperture not being used to prevent any block-making material from escaping during compression.

Figure 5A:
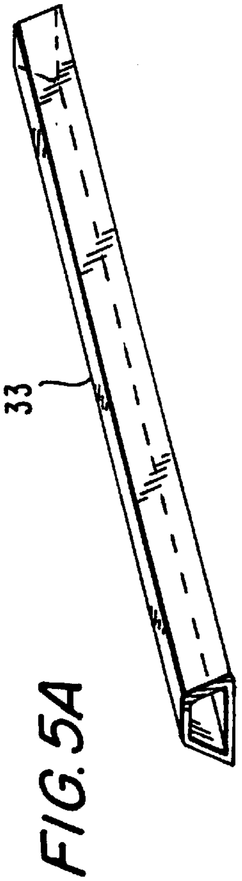
FIG. 5*a* is a perspective view of an illustrative rail that can be used as a block length control system in accordance with this invention.

FIG. 5*a* shows rail 33, which can also be used to control block length. In this embodiment, rail 33 can be longitudinally fixed in ramming chamber 16 to a ramming chamber liner or attached to ramming plate 30. In either case, ramming plate 30 is prevented from making blocks that are shorter than the length of rail 33. It will be appreciated that the presence of rail 33 in ramming chamber 16 during block formation will leave an impression in the blocks having a shape that is identical to rail 33.

Advantageously, that impression forms a chase through which electrical wiring or pipes can be fed. It will be appreciated that although rail 33 has a trapazoidal cross section, rail 33 could have any convenient cross section and shape, including a non-linear shape. It will be further appreciated that rail 33 need not be fixed against a ramming channel surface and could be suspended by affixing it to an intermediate position on ramming plate 30 to form an internal channel.

In yet another embodiment, the block length control system includes a ramming pressure measuring device and a switch, which is responsive to the measuring device, for cutting off the pressure applied to the ramming plate by the actuator when a set pressure is detected by ramming pressure measuring device. Blocks of uniform mass density and length can be substantially formed using this method when the volume of block-making material used is premeasured, as explained more fully below.

In an alternative to measuring pressure and/or volume, a block's length can be controlled by measuring the length of the block directly during formation of the block. In this case, a block's length can be measured using any block length measuring device and a switch (which is responsive to the device) for automatically cutting off the ramming pressure applied to ramming plate by actuator when a set block length is measured. In order to set a particular block length to which the switch will respond, or to simply visually determine a block's length during its formation, a length-measuring unit can be provided. The unit can include a stationary scale for reading a ramming chamber length, and a visual marker mechanically coupled to the ramming plate that indicates on the scale a ramming chamber length (e.g., sliding gate 41*a* of FIG. 13 can be used for this purpose). Alternatively, the unit can include a slidable scale for reading a ramming chamber length, and a stationary visual marker that indicates on the slidable scale a ramming chamber length. It will also be appreciated that the visual marker can be a mechanical arm capable of tripping a hydraulic lever, automatically causing the ramming plate to stop its forward ramming motion.

Figure 14:
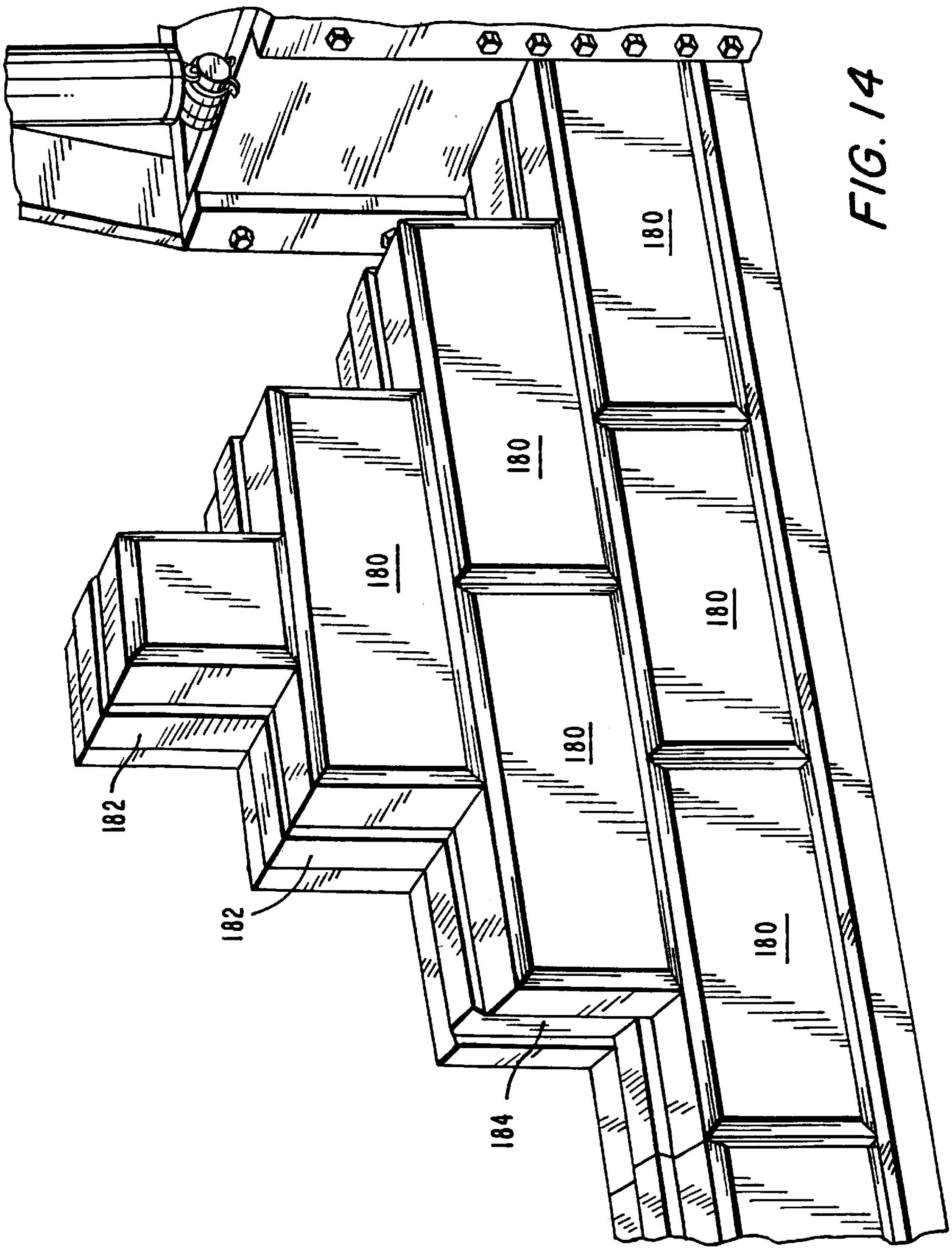
FIG. 14 shows a number of blocks, each having tongues and grooves on four sides, that were formed by the machine shown in FIG. 1, stacked on a platform next to the headgate assembly of the machine.

FIG. 14 shows an illustrative wall of blocks 180. Each of blocks 180 has end planes with vertically oriented surface features 182 and 184. Surface feature 182 is a tongue that extends outward from block 180. Surface feature 184 is a groove that extends inward toward block 180. As shown in FIG. 14, each of blocks 180 can have one end plane withtongue 182 and one end plane with groove 184. Alternatively, both end planes can have either the same surface feature (i.e., tongues or grooves). Because headgate 32 can move in a substantially vertical direction relative to the substantially horizontal longitudinal axis, both end planes of a block formed in machine 10 can have vertically oriented surface features. The presence of vertically oriented, interlocking surface features can be useful when building walls because, unlike horizontally oriented features, vertically oriented features prevent horizontal movement between adjacent blocks at the same horizontal layer.

A typical range of ramming pressures that can be used for forming rammed earth blocks is between about 1500 psi and about 2500 psi, although higher ramming pressures can be used if the hydraulic pump, hoses, and controller are compatible with the higher pressures. Also, it has been found that there is no substantial advantage to holding pressure for an extended period of time once the target block length or ramming pressure is achieved.

Thus, a block ramming machine and a method for its use are provided. The machine is particularly well suited for use with compressed earth blocks and can be manually operated and hydraulically or pneumatically powered. One skilled in the art will appreciate that the present invention can be practiced by other than the described embodiments, which are presented for purposes of illustration and not of limitation, and the present invention is limited only by the claims which follow.

I claim:

1. A block ramming machine for making blocks with block-making material, said machine comprising:

a ramming chamber structure having a longitudinal axis, an input end, an output end, and a ramming chamber located between said input and output ends;

a headgate assembly located adjacent said output end of said ramming chamber, wherein said assembly comprises a headgate having at least an open position and a closed position, and wherein said headgate has at least one wedge shaped portion, said headgate assembly further comprising a headgate frame oriented such that said headgate can slide in a plane at an angle of up to about 10 degrees from the vertical;

a fill chamber structure positioned along said longitudinal axis and having a first end, a second end, and a fill chamber located between said first and second ends, said input end and said second end being coupled so that said material is transferred from said fill chamber to said ramming chamber;

a ramming plate for pushing said material from said fill chamber to said ramming chamber; and an actuator for moving said ramming plate along said longitudinal axis from a position in said fill chamber to a position in said ramming chamber, thereby transferring said material from said fill chamber to said ramming chamber to form a block.

2. The machine of claim 1 wherein said ramming chamber and said fill chamber are aligned in a substantially horizontal relationship.

3. The machine of claim 1 further comprising a platform located at said output end of said ramming chamber for receiving said block after being formed.

4. The machine of claim 1 wherein said ramming chamber structure comprises a structural box having at least one inner surface.

5. The machine of claim 4 wherein said ramming chamber structure further comprises at least one replaceable liner attached to said inner surface.

6. The machine of claim 5 wherein said at least one replaceable liner has a chamber surface that is not flat.

7. The machine of claim 6 wherein said liner comprises a laminate structure.

8. The machine of claim 6 wherein said liner comprises an integral structure.

9. The machine of claim 6 wherein said liner chamber surface forms a block with a surface feature can interlocks with another block.

10. The machine of claim 9 wherein said surface feature is selected from a group consisting of a groove structure and a tongue structure.

11. The machine of claim 1 wherein said headgate assembly further comprises at least one replaceable headgate liner attached to an inner surface of said headgate.

12. The machine of claim 11 wherein said headgate liner has a chamber surface that is not flat.

13. The machine of claim 12 wherein said headgate liner is a laminate structure.

14. The machine of claim 12 wherein said liner comprises an integral structure.

15. The machine of claim 11 wherein said headgate liner has a chamber surface such that any block formed therewith has a surface feature that interlocks with another block.

16. The machine of claim 1 wherein said headgate assembly further comprises a headgate frame in which said headgate is slidable between said open and closed positions.

17. The machine of claim 16 wherein said headgate frame is oriented such that said headgate can slide in a plane selected from a group consisting of a substantially vertical plane and a plane that has an angle between about 1 degree and 10 degrees from vertical.

18. The machine of claim 1 wherein said headgate frame has at least one tapered track in which said wedge shaped portion slides.

19. The machine of claim 18 wherein said headgate frame is oriented such that a chamber surface of a liner attached to said headgate is substantially perpendicular to said longitudinal axis of said machine.

20. The machine of claim 1 wherein said headgate further comprises at least one camming plate against which said wedge shaped portion slides.

21. The machine of claim 1 wherein said fill chamber structure includes a sliding gate having at least a sliding gate open position that permits loading of said block-making material into said fill chamber.

22. The machine of claim 21 wherein said sliding gate is mechanically coupled to said ramming plate.

23. The machine of claim 22 wherein said sliding gate is mechanically coupled to said ramming plate so that said sliding gate moves when said ramming plate moves.

24. The machine of claim 22 wherein said sliding gate is in a closed position when said ramming plate is in said ramming chamber, and wherein said sliding gate is in an open position when said ramming plate is in said fill chamber.

25. The machine of claim 1 further comprising a hopper having an input and an output, said hopper output being coupled to said fill chamber for providing said material to said fill chamber.

26. The machine of claim 25 further comprising a sliding gate between said hopper and said fill chamber that prevents said block-making material from flowing from said hopper into said fill chamber behind said ramming plate when said ramming plate is pushing said material.

27. The machine of claim 25 further comprising a volume control system in said hopper for controlling the volume of material provided to said fill chamber via said hopper.

28. The machine of claim 1 further comprising a block length control system for controlling the length of the block formed.

29. The machine of claim 28 wherein said block length control system comprises a mechanical stop so that said ramming plate can not push material past a predetermined position in said ramming chamber.

30. The machine of claim 28 wherein said block length control system comprises a rail coupled to said ramming plate so that said ramming plate can not push material past a predetermined position in said ramming chamber.

31. The machine of claim 28 wherein said actuator moves said ramming plate by applying a pressure thereto, and wherein said block length control system comprises:

a ramming pressure measuring device; and a switch for cutting off said pressure applied to said ramming plate when a set pressure is measured by said ramming pressure measuring device.

32. The machine of claim 28 wherein said block length control structure comprises:

a block length measuring device; and a switch for cutting off pressure applied to said ramming plate by said actuator when a set block length is measured by said block length measuring device.

33. The machine of claim 1 wherein said headgate frame comprises at least a tapered track in which said at least one wedge shape portion is slidably confined.

34. The machine of claim 1 wherein said headgate assembly further comprises readjustment shims for compensating wear of headgate assembly components.

35. A block ramming machine for making blocks with block-making material, said machine comprising:

a ramming chamber structure having a longitudinal axis, an input end, an output end, and a ramming chamber located between said input and output ends, wherein said ramming chamber structure comprises a structural box having at least one inner surface, and wherein said ramming chamber structure further comprises at least one replaceable liner attached to said inner surface;

a headgate assembly located adjacent said output end of said ramming chamber, wherein said assembly comprises a headgate having at least an open position and a closed position, said positions being in substantial vertical alignment, wherein said headgate assembly further comprises at least one replaceable headgate liner attached to an inner surface of said headgate so that said formed block includes a vertically oriented surface feature;

a fill chamber structure positioned along said longitudinal axis and having a first end, a second end, and a fill chamber located between said first and second ends, wherein said input end and said second end are coupled so that said material is transferred from said fill chamber to said ramming chamber, and wherein said ramming chamber and said fill chamber are aligned in a substantially horizontal relationship;

a ramming plate for pushing said material from said fill chamber to said ramming chamber, said ramming plate having a face substantially covered by a replaceable liner; and an actuator for moving said ramming plate along said longitudinal axis from a position in said fill chamber to a position in said ramming chamber, thereby transferring said material from said fill chamber to said ramming chamber to form a block.

36. The machine of claim 35 further comprising a platform located at said output end of said ramming chamber for receiving said block after being formed, said platform being capable of supporting a queue of formed blocks extending a direction substantially parallel with said longitudinal axis.

37. The machine of claim 35 wherein said at least one replaceable liner has a chamber surface that is not flat.

38. The machine of claim 35 wherein said headgate assembly further comprises a headgate frame in which said headgate is slidable between said open and closed positions.

39. The machine of claim 38 wherein said headgate has at least one wedge shaped portion.

40. The machine of claim 39 wherein said headgate frame has at least one tapered track in which said wedge shaped portion slides.

41. The machine of claim 39 wherein said headgate further comprises at least one camming plate against which said wedge shaped portion slides.

42. The machine of claim 35 wherein said fill chamber structure includes a sliding gate having at least a sliding gate open position that permits loading of said block-making material into said fill chamber.

43. The machine of claim 42 wherein said sliding gate is mechanically coupled to said ramming plate.

44. The machine of claim 42 wherein said sliding gate is in a closed position when said ramming plate is in said ramming chamber, and wherein said sliding gate is in an open position when said ramming plate is in said fill chamber.

45. The machine of claim 35 further comprising a hopper having an input and an output, said hopper output being coupled to said fill chamber for providing said material to said fill chamber.

46. The machine of claim 35 wherein machine components including said ramming chamber structure, said headgate assembly, said fill chamber structure, said a ramming plate, are dismantlable for field transport.

47. The machine of claim 35 wherein said actuator is powered by an external power source selected from a group consisting of tractors, cars, trucks, electric motors, and combustion engines.

* * * * *